United States Patent
Horn et al.

(10) Patent No.: US 12,425,091 B2
(45) Date of Patent: Sep. 23, 2025

(54) BEAM REFINEMENT PROCEDURE

(71) Applicant: QUALCOMM Incorporated, San Diego, CA (US)

(72) Inventors: Idan Michael Horn, Hod Hasharon (IL); Shay Landis, Hod Hasharon (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/443,571

(22) Filed: Feb. 16, 2024

(65) Prior Publication Data
US 2024/0195558 A1    Jun. 13, 2024

Related U.S. Application Data

(62) Division of application No. 17/445,326, filed on Aug. 18, 2021, now Pat. No. 11,936,579.

(60) Provisional application No. 62/706,748, filed on Sep. 8, 2020.

(51) Int. Cl.
| | |
|---|---|
| *H04L 5/00* | (2006.01) |
| *H04J 1/02* | (2006.01) |
| *H04W 24/10* | (2009.01) |
| *H04W 72/04* | (2023.01) |
| *H04W 72/044* | (2023.01) |

(52) U.S. Cl.
CPC .............. *H04L 5/0048* (2013.01); *H04J 1/02* (2013.01); *H04W 72/046* (2013.01); *H04W 24/10* (2013.01)

(58) Field of Classification Search
CPC ............. H04W 72/046; H04W 72/542; H04W 72/0453; H04W 16/28; H04B 7/0684; H04B 7/0617; H04B 7/088; H04B 7/0695
See application file for complete search history.

(56) References Cited

U.S. PATENT DOCUMENTS

| | | | |
|---|---|---|---|
| 2015/0009951 A1* | 1/2015 | Josiam ................ | H04L 25/0224 370/330 |
| 2017/0303263 A1* | 10/2017 | Islam .................... | H04B 7/0626 |
| 2018/0054245 A1* | 2/2018 | Trainin ................ | H04B 7/0695 |
| 2018/0092129 A1* | 3/2018 | Guo ..................... | H04B 7/0695 |
| 2018/0132114 A1* | 5/2018 | Sun ........................ | H04B 7/088 |
| 2018/0132217 A1* | 5/2018 | Stirling-Gallacher ...................... H04L 5/0053 |
| 2018/0279145 A1* | 9/2018 | Jung ..................... | H04L 5/0051 |
| 2018/0323926 A1* | 11/2018 | Cezanne ............... | H04W 72/23 |
| 2018/0343595 A1* | 11/2018 | da Silva ............... | H04J 11/0073 |
| 2019/0053321 A1* | 2/2019 | Islam ................... | H04W 72/542 |
| 2019/0173562 A1 | 6/2019 | Yu et al. | |
| 2020/0228180 A1* | 7/2020 | Zhang .................. | H04B 7/0628 |
| 2022/0077976 A1* | 3/2022 | Horn ..................... | H04L 5/0091 |
| 2022/0077985 A1 | 3/2022 | Horn | |

(Continued)

*Primary Examiner* — Yee F Lam
(74) *Attorney, Agent, or Firm* — Harrity & Harrity, LLP

(57) ABSTRACT

Various aspects of the present disclosure generally relate to wireless communication. In some aspects, a network entity may receive an indication of a capability to perform a beam refinement procedure that includes receiving multiple reference signals, via multiple beams using frequency division multiplexing, during a single reference signal burst. The network entity may transmit the multiple reference signals during the single reference signal burst using frequency division multiplexing. Numerous other aspects are provided.

20 Claims, 10 Drawing Sheets

(56) References Cited

U.S. PATENT DOCUMENTS

2022/0376768 A1\* 11/2022 Harrebek .............. H04B 7/088

\* cited by examiner

BEAM REFINEMENT PROCEDURE

CROSS-REFERENCE TO RELATED APPLICATIONS

This application is a divisional of U.S. patent application Ser. No. 17/445,326, filed Aug. 18, 2021, entitled "BEAM REFINEMENT PROCEDURE," which claims priority to U.S. Provisional Patent Application No. 62/706,748, filed on Sep. 8, 2020, also entitled "BEAM REFINEMENT PROCEDURE," the contents of which are incorporated herein by reference in their entireties.

FIELD OF THE DISCLOSURE

Aspects of the present disclosure generally relate to wireless communication and to techniques and apparatuses for a beam refinement procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting an indication of a capability to perform a beam refinement procedure that includes receiving multiple reference signals, via multiple beams using frequency division multiplexing, during a single reference signal burst; and receiving the multiple reference signals during the single reference signal burst using frequency division multiplexing.

In some aspects, a method of wireless communication performed by a base station includes receiving, from a UE, an indication of a capability of the UE to perform a beam refinement procedure that includes receiving multiple reference signals, via multiple beams using frequency division multiplexing, during a single reference signal burst; and transmitting, to the UE, the multiple reference signals during the single reference signal burst using frequency division multiplexing.

In some aspects, a UE for wireless communication includes a memory; and one or more processors coupled to the memory, the one or more processors configured to: transmit an indication of a capability to perform a beam refinement procedure that includes receiving multiple reference signals, via multiple beams using frequency division multiplexing, during a single reference signal burst; and receive the multiple reference signals during the single reference signal burst using frequency division multiplexing.

In some aspects, a base station for wireless communication includes a memory; and one or more processors coupled to the memory, the one or more processors configured to: receive, from a UE, an indication of a capability of the UE to perform a beam refinement procedure that includes receiving multiple reference signals, via multiple beams using frequency division multiplexing, during a single reference signal burst; and transmit, to the UE, the multiple reference signals during the single reference signal burst using frequency division multiplexing.

In some aspects, a non-transitory computer-readable medium storing a set of instructions for wireless communication includes one or more instructions that, when executed by one or more processors of a UE, cause the UE to: transmit an indication of a capability to perform a beam refinement procedure that includes receiving multiple reference signals, via multiple beams using frequency division multiplexing, during a single reference signal burst; and receive the multiple reference signals during the single reference signal burst using frequency division multiplexing.

In some aspects, a non-transitory computer-readable medium storing a set of instructions for wireless communication includes one or more instructions that, when executed by one or more processors of a base station, cause the base station to: receive, from a UE, an indication of a capability of the UE to perform a beam refinement procedure that includes receiving multiple reference signals, via multiple beams using frequency division multiplexing, during a single reference signal burst; and transmit, to the UE, the multiple reference signals during the single reference signal burst using frequency division multiplexing.

In some aspects, an apparatus for wireless communication includes means for transmitting an indication of a capability to perform a beam refinement procedure that includes receiving multiple reference signals, via multiple beams using frequency division multiplexing, during a single reference signal burst; and means for receiving the multiple reference signals during the single reference signal burst using frequency division multiplexing.

In some aspects, an apparatus for wireless communication includes means for receiving, from a UE, an indication of a capability of the UE to perform a beam refinement procedure that includes receiving multiple reference signals, via multiple beams using frequency division multiplexing, during a single reference signal burst; and means for transmitting, to the UE, the multiple reference signals during the single reference signal burst using frequency division multiplexing.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
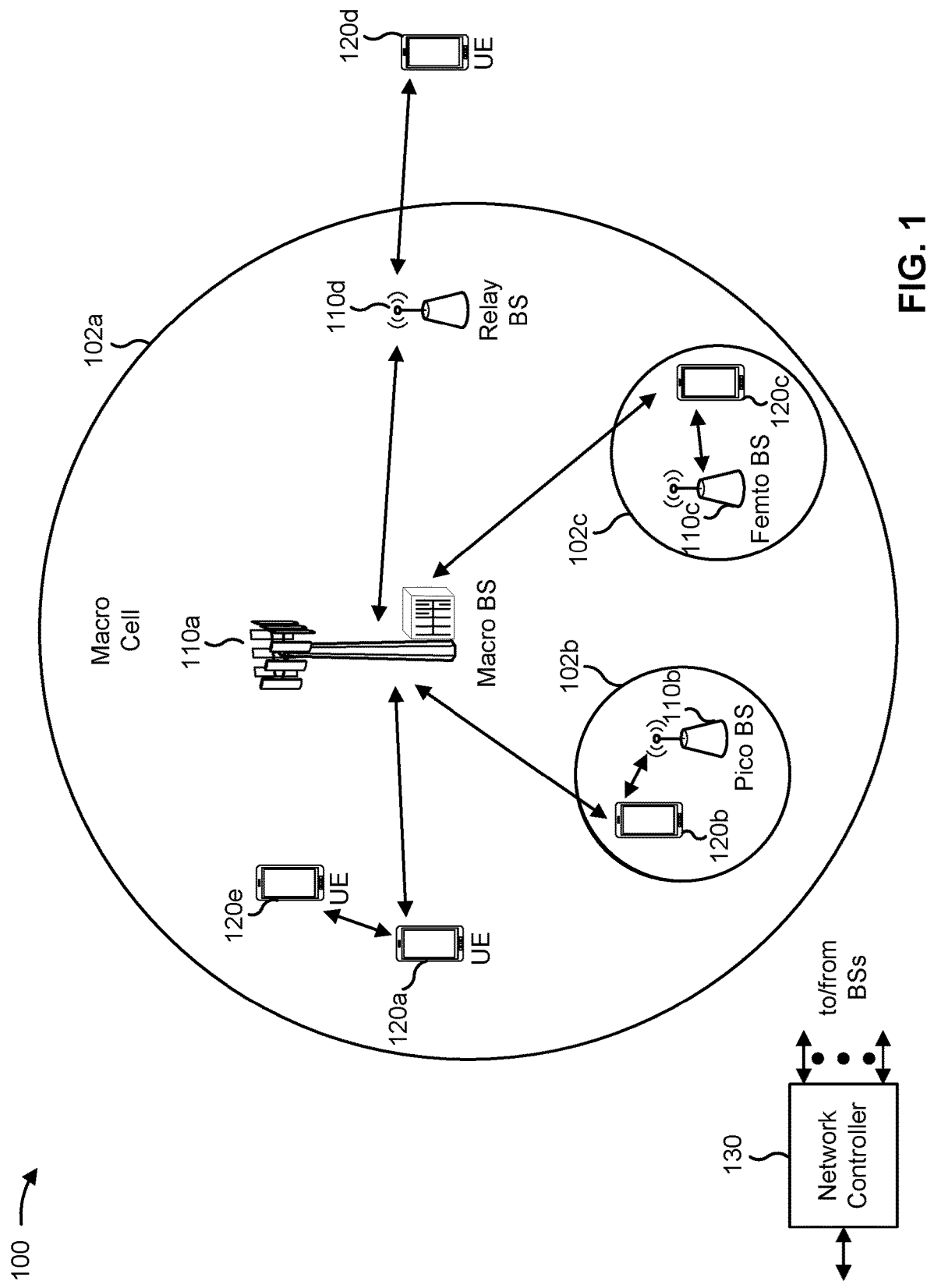
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120c) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHZ) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHZ, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
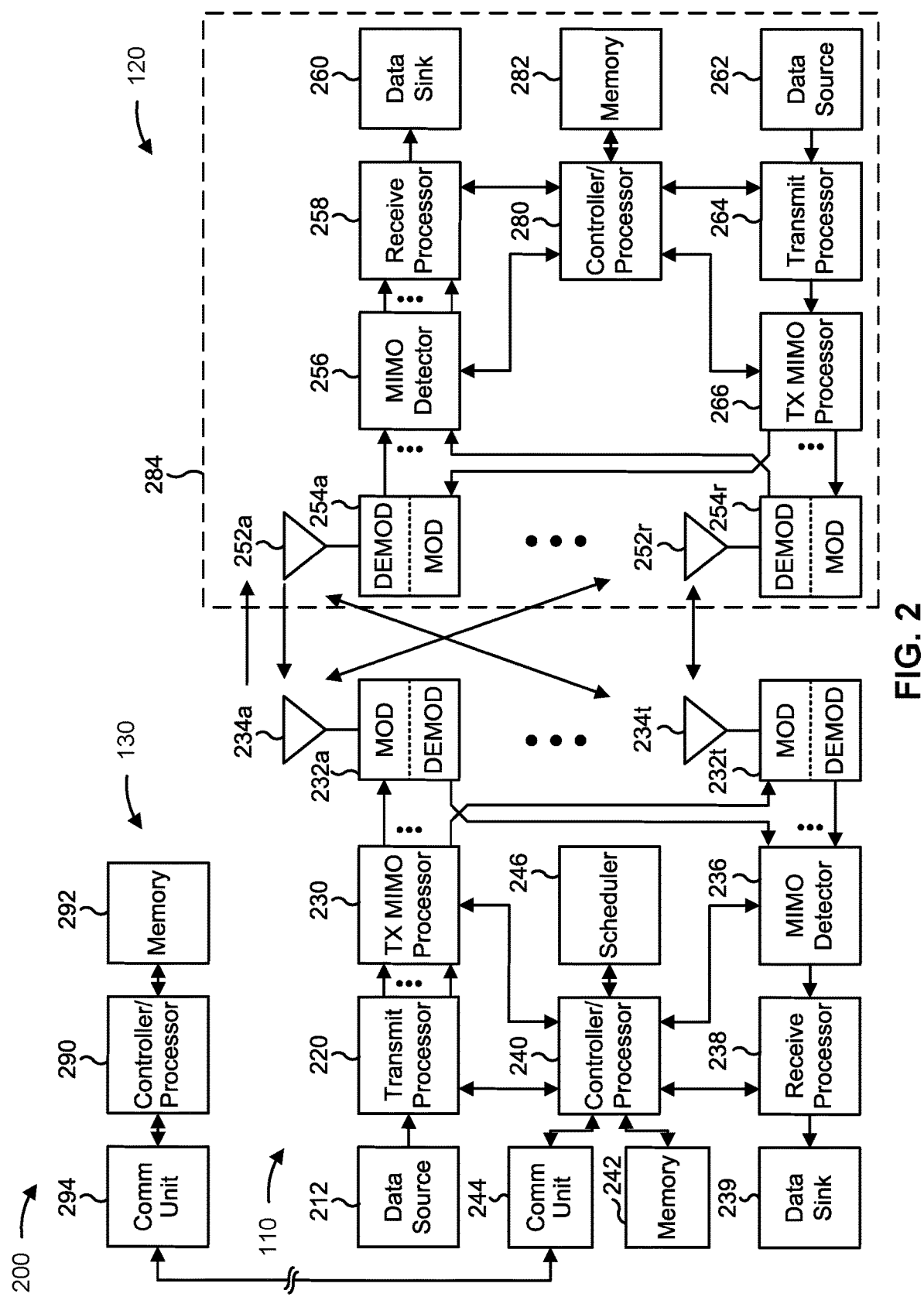
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-8.

Controller/processor 240 of base station 110, controller/processor 280 of UE 120, and/or any other component(s) of FIG. 2 may perform one or more techniques associated with a beam refinement procedure, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE includes means for transmitting an indication of a capability to perform a beam refinement procedure that includes receiving multiple reference signals, via multiple beams using frequency division multiplexing, during a single reference signal burst; and/or means for receiving the multiple reference signals during the single reference signal burst using frequency division multiplexing. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for measuring the multiple reference signals; and/or means for transmitting a report of measurements of the multiple reference signals.

In some aspects, the UE includes means for measuring the multiple reference signals using multiple UE beams; and/or means for selecting one or more beam pairs that each include a base station beam, associated with a reference signal of the multiple reference signals, and a UE beam, of the multiple UE beams.

In some aspects, the UE includes means for transmitting, to a base station, an indication of the base station beam of each of the one or more beam pairs.

In some aspects, the UE includes means for receiving an indication of resource locations associated with the multiple reference signals.

In some aspects, the UE includes means for receiving radio resource control signaling that includes the indication of the resource locations associated with the multiple reference signals; means for receiving a channel state information reference signal reference resource that includes the indication of the resource locations associated with the multiple reference signals; or means for receiving configuration information that associates the resource locations with reference signal identifications of the multiple reference signals.

In some aspects, the base station includes means for receiving, from a UE, an indication of a capability of the UE to perform a beam refinement procedure that includes receiving multiple reference signals, via multiple beams using frequency division multiplexing, during a single reference signal burst; and/or means for transmitting, to the UE, the multiple reference signals during the single reference signal burst using frequency division multiplexing. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station includes means for receiving a report of measurements of the multiple reference signals.

In some aspects, the base station includes means for transmitting an indication of resource locations associated with the multiple reference signals.

In some aspects, the base station includes means for transmitting radio resource control signaling that includes the indication of the resource locations associated with the multiple reference signals; means for transmitting a channel state information reference signal reference resource that includes the indication of the resource locations associated with the multiple reference signals; or means for transmitting configuration information that associates the resource locations with reference signal identifications of the multiple reference signals.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
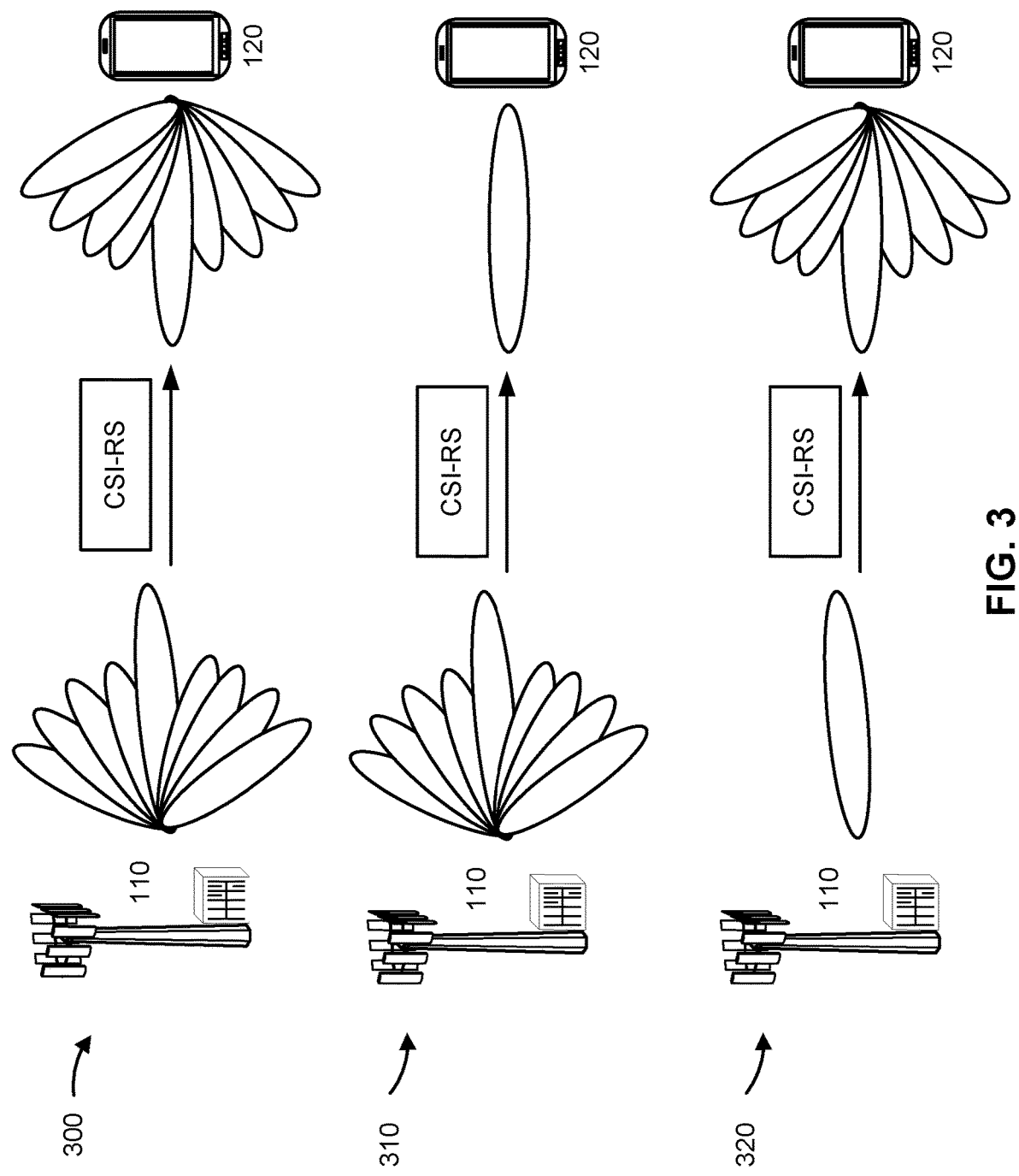
FIGS. 3 and 4 are diagrams illustrating examples beam management procedures, in accordance with the present disclosure.

FIG. 3 is a diagram illustrating examples 300, 310, and 320 of channel state information reference signal (CSI-RS) beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., a radio resource control (RRC) connected state and/or the like).

As shown in FIG. 3, example 300 may include a base station 110 and a UE 120 communicating to perform beam management using CSI-RSs synchronization signal blocks (SSBs), and/or another type of reference signal. Example 300 depicts a first beam management procedure (e.g., P1 beam management). The first beam management procedure may be referred to as a beam selection procedure, an initial beam acquisition procedure, a beam sweeping procedure, a cell search procedure, a beam search procedure, and/or the like. As shown in FIG. 3 and example 300, CSI-RSs may be configured to be transmitted from the base station 110 to the UE 120. The CSI-RSs may be configured to be periodic (e.g., using RRC signaling and/or the like), semi-persistent (e.g., using media access control (MAC) control element (MAC-CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management process may also use synchronization signal blocks (SSBs) for beam management in a similar manner as described above.

As shown in FIG. 3, example 310 may include a base station 110 and a UE 120 communicating to perform beam management using CSI-RSs and/or SSBs. Example 310 depicts a second beam management procedure (e.g., P2 beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 3, example 320 depicts a third beam management procedure (e.g., P3 beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, the UE 120 and the base station 110 may perform a similar beam management procedure to select a UE transmit beam, and/or the like.

Figure 4:
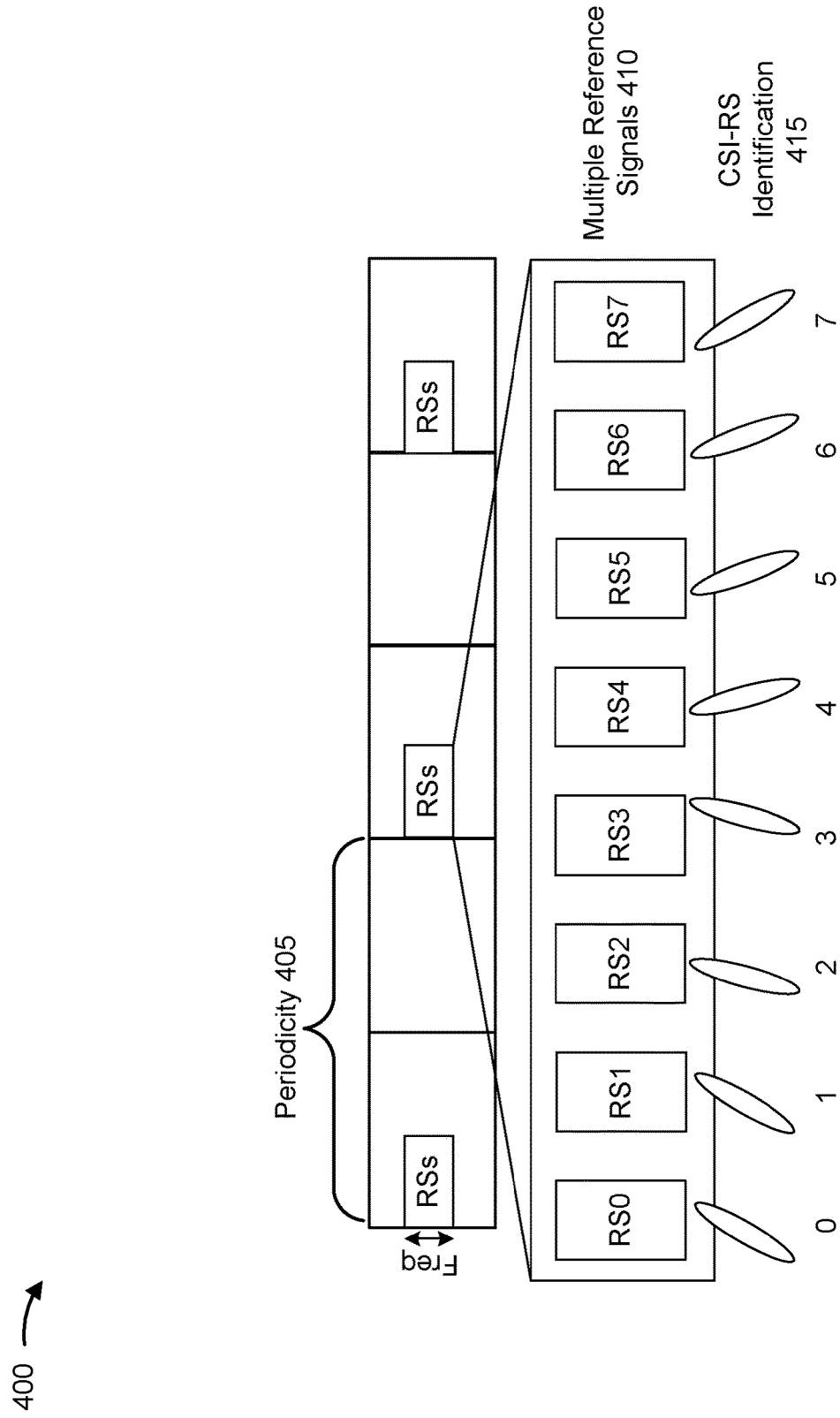

FIG. 4 is a diagram illustrating an example 400 of beam management procedures, in accordance with the present disclosure. Example 400 illustrates a scheme for transmitting reference signals (e.g., CSI-RSs) from a first device (e.g., a base station 110) to a second device (e.g., a UE 120). Example 400 may be used in a beam management procedure, such as a P2 beam management procedure.

As shown in FIG. 4, the first device may transmit reference signals with a periodicity 405. In other words, a reference signal transmission occasion for transmitting multiple reference signals for a P2 beam management procedure may have the periodicity 405 (e.g., 20 milliseconds).

During a reference signal transmission occasion, the first device may transmit multiple reference signals 410 (e.g., RS0 through RS7). The first device may transmit the multiple reference signals 410 using different beams having CSI-RS identifications 415.

The first device may transmit the reference signals after performing a P1 beam management procedure. For example, the first device and the second device may perform the P1 beam management procedure to select a wide beam before transmitting the multiple reference signals 410 on relatively narrow beams that are associated with the wide beam.

Based at least in part on the duration of the reference signal transmission occasion being sufficient to transmit each of the multiple reference signals with time division multiplexing, the reference signal transmission occasion may consume network resource and lower spectral efficiency of communications between the first device and the second device. For example, in some wireless networks, symbols designated for beam management may not be useable for data transmissions.

As indicated above, FIG. 4 is provided as an example. Other examples may differ from what is described with regard to FIG. 4.

In some wireless networks, some wireless communication devices (e.g., UEs 120 and/or base stations 110) may be configured with a capability to perform multiple beamforming operations during a same symbol. In other words, some wireless communication devices transmit and/or receive communications using multiple beams during a same symbol.

In some wireless networks, such as those that operate in the sub-terahertz (THz) frequency range, communication channels may have relatively high throughputs and relatively high power consumption. To conserve power resources, wireless communication devices may communicate using short bursts instead of continuous transmissions and/or receptions. For example, a burst (e.g., a short burst) may include a signal transmitted over only a portion of a slot. The portion of the slot may include one or more symbols, such as a number of symbols that is less than or equal to one half of all symbols the slot (e.g., a single symbol, two symbols, or three symbols, among other examples).

In some aspects described herein, based at least in part on capability of a UE, a base station may transmit multiple reference signals via multiple beams using frequency division multiplexing during a single reference signal burst for beam refinement (e.g., a P2 beam management procedure). Based at least in part on the base station transmitting multiple reference signals via multiple beams using frequency division multiplexing during a single reference signal burst, a duration of a reference signal transmission occasion may be reduced (e.g., to 1 symbol). This may reduce a consumption of network resources (e.g., by reducing overhead) and increase spectral efficiency for communications between the base station and the UE. Additionally, or alternatively, a periodicity of the reference signal transmission occasion may be reduced, based at least in part on the duration being reduced, to facilitate more frequent beam management procedures. This may improve signal strength metrics (e.g., RSRP, RSRQ, and/or signal to interference plus noise ratio (SINR)), facilitate increased MCS for communications, and/or improved spectral efficiency.

Figure 5:
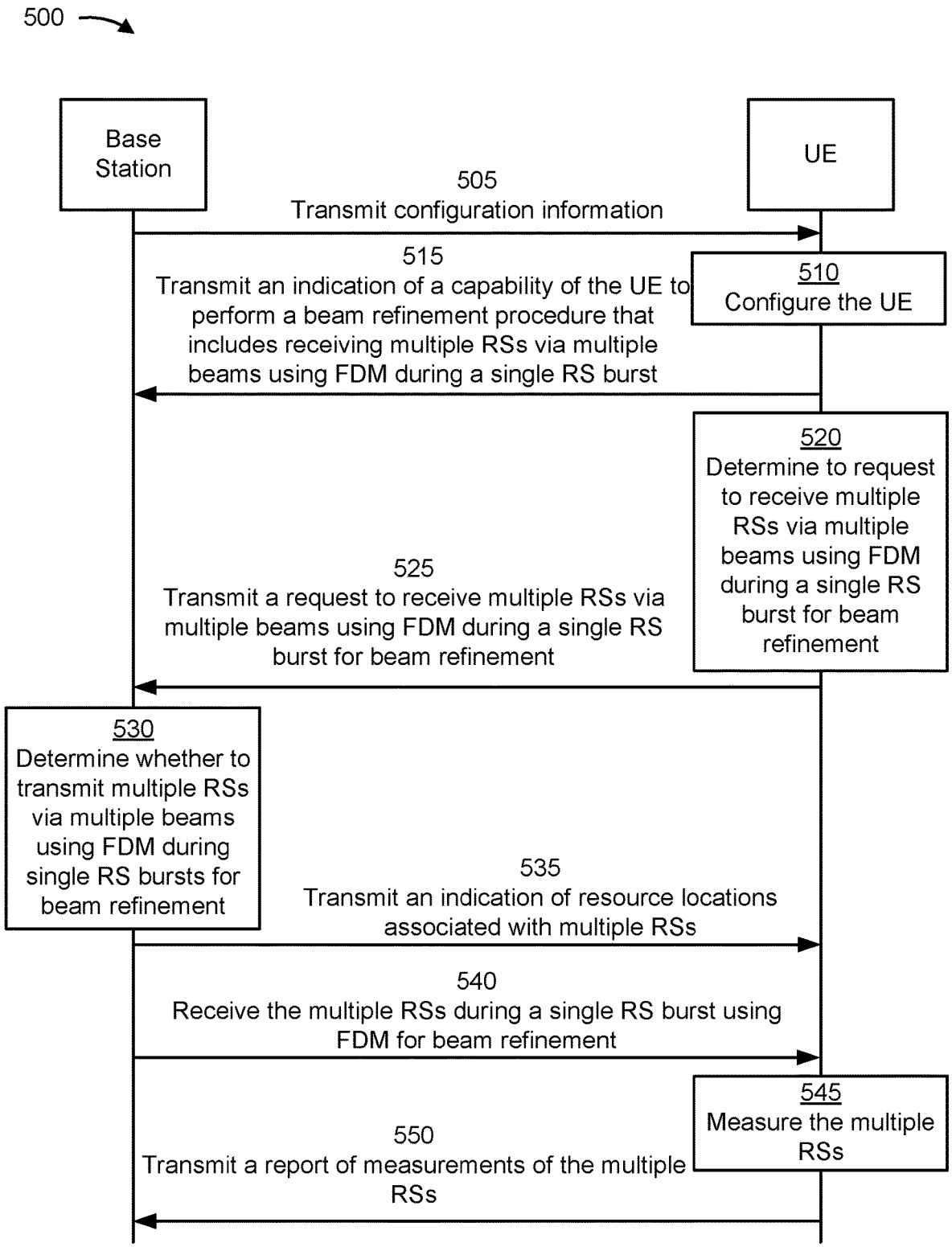
FIGS. 5 and 6 are diagrams illustrating examples associated with a beam refinement procedure, in accordance with the present disclosure.

FIG. 5 is a diagram illustrating an example 500 associated with a beam refinement procedure, in accordance with the present disclosure. As shown in FIG. 5, a UE (e.g., UE 120) may communicate with a base station (e.g., base station 110). The UE and the base station may be part of a wireless network (e.g., wireless network 100). In some aspects, the UE and the base station may perform a beam management procedure, such as one or more beam refinement procedures, that includes receiving multiple RSs via multiple beams using frequency division multiplexing during a single RS burst.

As shown by reference number 505, the base station may transmit, and the UE may receive, configuration information. In some aspects, the UE may receive configuration information from another device (e.g., from another base station and/or another UE) and/or a communication standard, among other examples. In some aspects, the UE may receive the configuration information via one or more of RRC signaling, medium access control (MAC) signaling (e.g., MAC control elements (MAC CEs)), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to provide an indication of a capability of the UE to beamform using multiple beams during a single reference signal burst (e.g., simultaneously). In other words, the configuration information may indicate that the UE is to provide an indication of a capability to perform a beam refinement procedure that includes receiving multiple reference signals, via multiple beams using frequency division multiplexing, during a single reference signal burst. In some aspects, the configuration information may indicate that the base station may transmit multiple reference signals via multiple beams using frequency division multiplexing during a single reference signal burst.

In some aspects, the configuration information may indicate that the base station is to provide an indication of whether performance of a beam refinement procedure that includes receiving multiple reference signals, via multiple beams using frequency division multiplexing, during a single reference signal burst is enabled. In some aspects, the configuration information may indicate that the UE is to be configured to perform a beam refinement procedure that includes receiving multiple reference signals, via multiple beams using frequency division multiplexing, during a single reference signal burst for a single procedure (e.g., a P2 beam management procedure and/or a P3 beam management procedure), a specified number of procedures, a set of procedures associated with a configured grant, procedures within a specified time period, and/or the like.

As shown by reference number 510, the UE may configure the UE for communicating with the base station. In some aspects, the UE may configure the UE based at least in part on the configuration information. In some aspects, the UE may be configured to perform one or more operations described herein.

As shown by reference number 515, the UE may transmit, and the base station may receive, an indication of a capability of the UE to perform a beam refinement procedure that includes receiving multiple reference signals, via multiple beams using frequency division multiplexing, during a single reference signal burst. In some aspects, the UE may transmit the indication via RRC signaling, one or more MAC CEs, a physical uplink control channel (PUCCH) message, and/or the like. In some aspects, the multiple reference signals may include multiple CSI-RSs. In some aspects, the indication of the capability of the UE to perform a beam refinement procedure that includes receiving multiple reference signals, via multiple beams using frequency division multiplexing, during a single reference signal burst may indicate such capability for a beam management procedure (e.g., a P2 beam management procedure and/or a P3 beam management procedure).

As shown by reference number 520, the UE may determine to request to receive multiple reference signals, via multiple beams using frequency division multiplexing, during a single reference signal burst for beam refinement. In some aspects, the UE may determine to request to perform a beam refinement procedure that includes receiving multiple reference signals, via multiple beams using frequency division multiplexing, during a single reference signal burst based at least in part on one or more metrics, such as an amount of data buffered for uplink transmission or downlink transmission that satisfies a threshold, a size of a resource grant associated with one or more uplink transmissions or downlink transmissions (e.g., compared with the amount of data buffered for transmission), and/or a power metric of the UE, among other examples. In some aspects, the UE may determine to request to perform a beam refinement procedure that includes receiving multiple reference signals, via multiple beams using frequency division multiplexing, during a single reference signal burst based at least in part on historical metrics, current metrics, predicted metrics, and/or the like.

As shown by reference number 525, the UE may transmit, and the base station may receive, a request to receive multiple RSs via multiple beams using frequency division multiplexing (FDM) during a single RS burst for beam refinement to perform a beam refinement procedure that includes receiving multiple reference signals, via multiple beams using frequency division multiplexing, during a single reference signal burst. In some aspects, the UE may transmit the request via a physical uplink shared channel (PUSCH) transmission. In some aspects, the request may include a single bit indicator of whether using frequency division multiplexing during a single reference signal burst is requested for a single procedure (e.g., a P2 beam management procedure and/or a P1 beam management procedure), a specified number of procedures, a set of procedures associated with a configured grant, procedures within a specified time period, and/or the like. In some aspects, the request may explicitly or implicitly indicate the capability of the UE to perform a beam refinement procedure that includes receiving multiple reference signals, via multiple beams using frequency division multiplexing, during a single reference signal burst. For example, by transmitting the request, the UE may implicitly indicate that the UE is capable of receiving multiple reference signals via multiple beams using frequency division multiplexing during a single reference signal burst.

In some aspects, the request may apply to a single procedure (e.g., a P2 beam management procedure and/or a P1 beam management procedure), a specified number of procedures, a set of procedures associated with a configured grant, procedures within a specified time period, and/or the like based at least in part on a configuration (e.g., associated with the configuration information).

As shown by reference number 530, the base station may determine whether to perform a beam refinement procedure that includes transmitting multiple reference signals, via multiple beams using frequency division multiplexing, during a single reference signal burst. For example, the base station may determine whether to comply with a request from the UE to perform a beam refinement procedure that includes transmitting multiple reference signals, via multiple beams using frequency division multiplexing, during a single reference signal burst; the base station may determine, independently from a request from the UE, whether to perform a beam refinement procedure that includes transmitting multiple reference signals, via multiple beams using frequency division multiplexing, during a single reference signal burst; and/or the like. In some aspects, the base station may to perform a beam refinement procedure that includes transmitting multiple reference signals, via multiple beams using frequency division multiplexing, during a single reference signal burst based at least in part on the indication of the capability of the UE.

In some aspects, the base station may determine to comply, or to not comply, with a request from the UE based at least in part on one or more metrics, such as an amount of buffered data for a downlink transmission, a size of a resource grant of an associated transmission (e.g., to which the request applies), an RSRP associated with the UE, movement of the UE, MCS for upcoming communications, a predicted change of conditions for SINR, and/or the like.

In some aspects, the base station may determine, independently from a request from the UE, to perform a beam refinement procedure that includes transmitting multiple reference signals, via multiple beams using frequency division multiplexing, during a single reference signal burst based at least in part on one or more metrics, such as a network load associated with the base station, an amount of data buffered for uplink transmission or downlink transmission that satisfies a threshold, a size of a resource grant associated with one or more uplink transmissions or downlink transmissions (e.g., compared with the amount of data buffered for transmission), an RSRP associated with the UE satisfying a threshold, an SINR that satisfies a threshold, a capability of the UE to receive multiple RSs via multiple beams using frequency division multiplexing during single RS bursts, and/or the like. In some aspects, the base station may determine whether to perform a beam refinement procedure that includes transmitting multiple reference signals, via multiple beams using frequency division multiplexing, during a single reference signal burst based at least in part on historical metrics, current metrics, predicted metrics, and/or the like.

As shown by reference number 535, the base station may transmit, and the UE may receive, an indication of resource locations associated with multiple reference signals. The indication of resource locations may implicitly or explicitly indicate that the base station is configured to perform a beam refinement procedure that includes transmitting multiple reference signals, via multiple beams using frequency division multiplexing, during a single reference signal burst. In some aspects, the base station may transmit the indication of the resource locations via RRC signaling, DCI, and/or one or more MAC CEs that include the indication. In some aspects, the base station may transmit the indication of the resource locations via RRC signaling, DCI, and/or one or more MAC CEs that associate (e.g., indicate an association) the resource locations with reference signal identifications, among other examples.

In some aspects, the indication may apply to a single procedure, a specified number of procedures, a set of procedures associated with a configured grant, procedures within a specified time period, and/or the like.

As shown by reference number 540, the base station may transmit, and the UE may receive, the multiple reference signals during a single reference signal burst using frequency division multiplexing for beam refinement. In some aspects, the base station may transmit the multiple reference signals as part of a beam management process (e.g., a P2 beam management procedure and/or a P3 beam management procedure). In some aspects, the single reference signal burst may include a burst received over a single symbol. In some aspects, the burst may include a burst received over 2 or fewer symbols, 4 or fewer symbols, or 8 or fewer symbols, among other examples.

As shown by reference number 545, the UE may measure the multiple reference signals. In some aspects, the UE may determine one or more reference signals and/or one or more beams associated with a highest set of reference signal metrics (e.g., SINR, RSRP, and/or RSRQ, among other examples). In some aspects, the UE may measure one or more of the multiple reference signals using one or more UE receive beams. In some aspects, the UE may determine a combination of a reference signal and a receive beam that result in a highest reference signal metric. For example, the UE may determine that a first reference signal has a highest RSRP and that the highest RSRP is achieved when measuring the first reference signal with a first UE receive beam. In this way, the UE may perform a P2 beam management procedure and a P3 beam management procedure using reference signals received during a single symbol.

As shown by reference number 550, the UE may transmit a report of measurements of the multiple reference signals to the base station. In some aspects, the report may enable the base station to select a best transmit beam based at least in part on measurements of the CSI-RSs (e.g., measured by the UE).

Based at least in part on performing a beam refinement procedure that includes receiving multiple reference signals, via multiple beams using frequency division multiplexing, during a single reference signal burst, a duration of a reference signal transmission occasion may be reduced (e.g., to as few as 1 symbol). This may reduce a consumption of network resources (e.g., by reducing overhead) and increase spectral efficiency for communications between the base station and the UE. Additionally, or alternatively, a periodicity of the reference signal transmission occasion may be reduced, based at least in part on the duration being reduced, to facilitate more frequent beam management procedures. This may improve signal strength metrics (e.g., RSRP, RSRQ, and/or signal to interference plus noise ratio (SINR)), facilitate increased MCS for communications, and/or improved spectral efficiency.

As indicated above, FIG. 5 is provided as an example. Other examples may differ from what is described with regard to FIG. 5.

Figure 6:
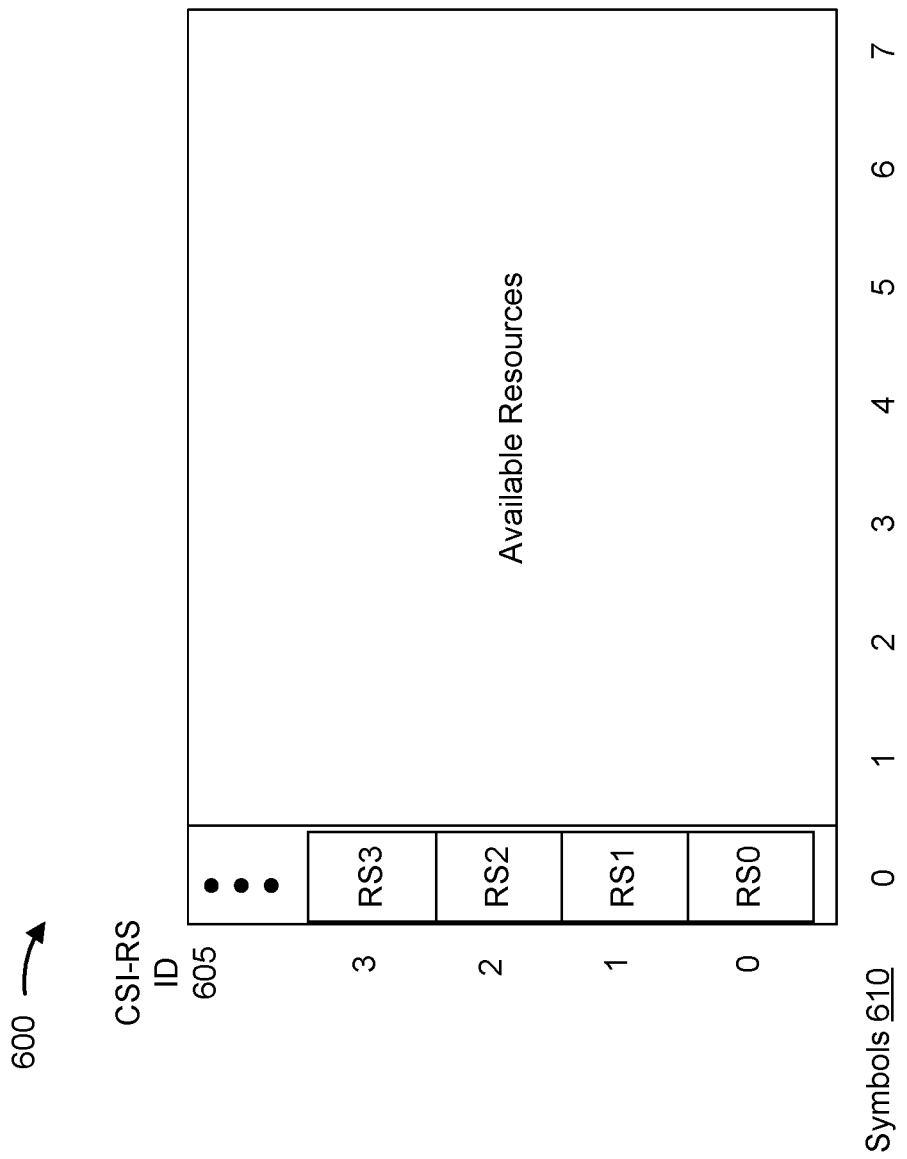

FIG. 6 is a diagram illustrating an example 600 associated with a beam refinement procedure, in accordance with the present disclosure. Example 600 illustrates a scheme for transmitting reference signals (e.g., CSI-RS) from a first device (e.g., a base station 110) to a second device (e.g., a UE 120). Example 600 may be used in a beam management procedure, such as a P2 beam management procedure and/or a P3 beam management procedure.

As shown in FIG. 6, the first device may transmit a burst 605 that includes frequency division multiplexed CSI-RSs. In some aspects, the first device may transmit the multiple CSI-RSs using different beams having different CSI-RS identifications.

As shown by example 600, the first device may transmit the CSI-RSs at different frequencies during symbol 0 (zero) of a set of symbols 610. In some aspects, the first device may transmit the CSI-RSs at different frequencies during multiple symbols. In some aspects, the base station may transmit the CSI-RSs using adjacent tones or adjacent resource blocks, among other examples. In some aspects, the base station may transmit the CSI-RSs with gaps in the frequency domain between CSI-RSs.

As shown by example 600, based at least in part on performing a beam refinement procedure that includes receiving multiple reference signals, via multiple beams using frequency division multiplexing, during a single reference signal burst, additional symbols may include available resources. For example, based at least in part on transmitting multiple reference signals, via multiple beams using frequency division multiplexing, during the symbol 0 (zero), the first device may use resources available on symbols 1-7 to communicate with the second device or other devices. Additionally, or alternatively, the first device may not communicate during the available resources to conserve power resources and/or to reduce heat generation.

As indicated above, FIG. 6 is provided as an example. Other examples may differ from what is described with regard to FIG. 6.

Figure 7:
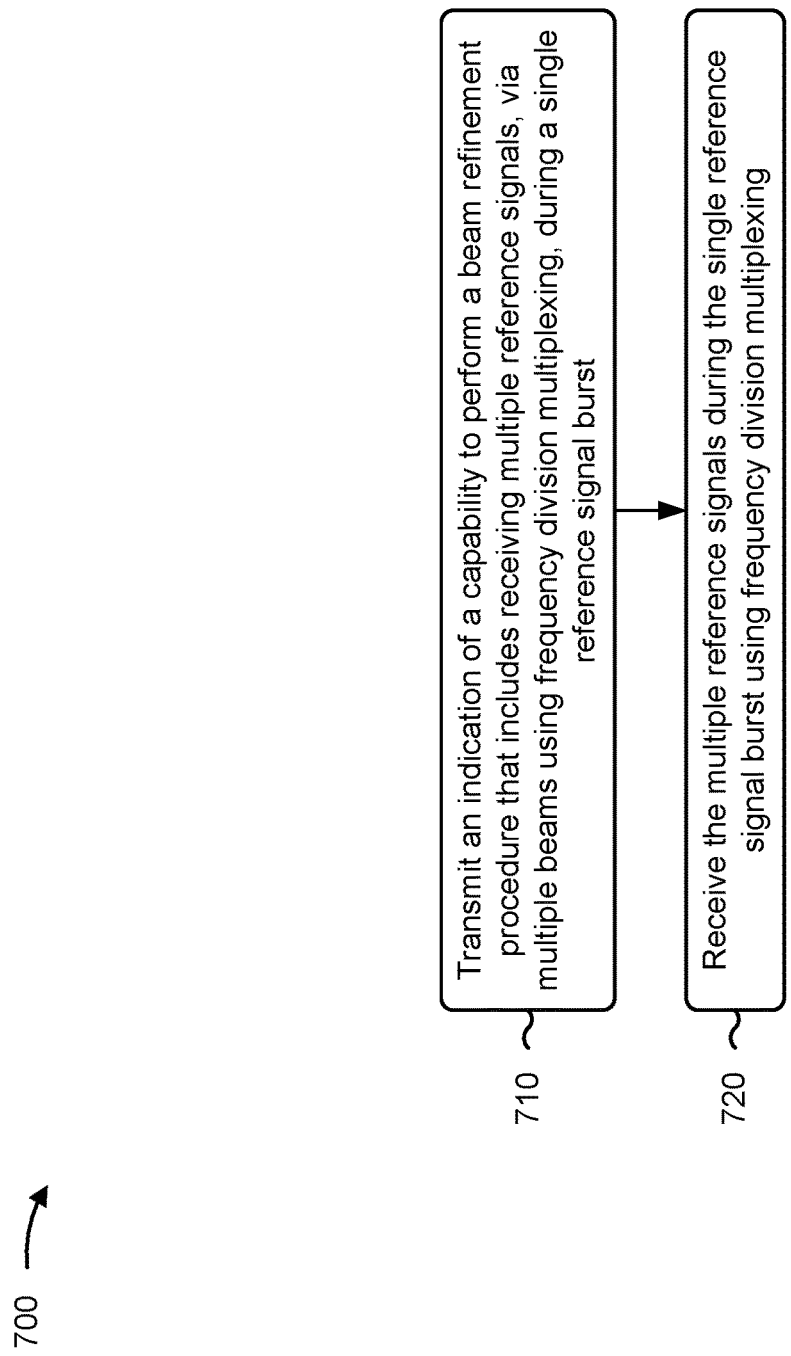
FIGS. 7 and 8 are diagrams illustrating example processes associated with a beam refinement procedure, in accordance with the present disclosure.

FIG. 7 is a diagram illustrating an example process 700 performed, for example, by a UE, in accordance with the present disclosure. Example process 700 is an example where the UE (e.g., UE 120) performs operations associated with beam refinement procedure.

As shown in FIG. 7, in some aspects, process 700 may include transmitting an indication of a capability to perform a beam refinement procedure that includes receiving multiple reference signals, via multiple beams using frequency division multiplexing, during a single reference signal burst (block 710). For example, the UE (e.g., using transmission component 904, depicted in FIG. 9) may transmit an indication of a capability to perform a beam refinement procedure that includes receiving multiple reference signals, via multiple beams using frequency division multiplexing, during a single reference signal burst, as described above.

As further shown in FIG. 7, in some aspects, process 700 may include receiving the multiple reference signals during the single reference signal burst using frequency division multiplexing (block 720). For example, the UE (e.g., using reception component 902, depicted in FIG. 9) may receive the multiple reference signals during the single reference signal burst using frequency division multiplexing, as described above.

Process 700 may include additional aspects, such as any single aspect or any combination of aspects described below and/or in connection with one or more other processes described elsewhere herein.

In a first aspect, the beam refinement procedure is associated with a previously performed base station beam selection procedure.

In a second aspect, alone or in combination with the first aspect, the base station beam selection procedure includes selection of a wide beam for an initial connection between a base station and the UE, and wherein the beam refinement procedure includes selection of a narrow beam, associated with the wide beam, for communications between the base station and the UE.

In a third aspect, alone or in combination with one or more of the first and second aspects, process 700 includes measuring the multiple reference signals, and transmitting a report of measurements of the multiple reference signals.

In a fourth aspect, alone or in combination with one or more of the first through third aspects, process 700 includes measuring the multiple reference signals using multiple UE beams, and selecting one or more beam pairs that each include a base station beam, associated with a reference signal of the multiple reference signals, and a UE beam, of the multiple UE beams.

In a fifth aspect, alone or in combination with one or more of the first through fourth aspects, process 700 includes transmitting, to a base station, an indication of the base station beam of each of the one or more beam pairs.

In a sixth aspect, alone or in combination with one or more of the first through fifth aspects, process 700 includes receiving an indication of resource locations associated with the multiple reference signals.

In a seventh aspect, alone or in combination with one or more of the first through sixth aspects, receiving the indication of the resource locations associated with the multiple reference signals includes one or more of receiving RRC signaling that includes the indication of the resource locations associated with the multiple reference signals, receiving a CSI-RS reference resource that includes the indication of the resource locations associated with the multiple reference signals, or receiving configuration information that associates the resource locations with reference signal identifications of the multiple reference signals.

In an eighth aspect, alone or in combination with one or more of the first through seventh aspects, the multiple reference signals include multiple CSI-RSs.

In a ninth aspect, alone or in combination with one or more of the first through eighth aspects, each reference signal of the multiple reference signals is located at different frequencies.

In a tenth aspect, alone or in combination with one or more of the first through ninth aspects, the single reference signal burst includes a burst received over a single symbol.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
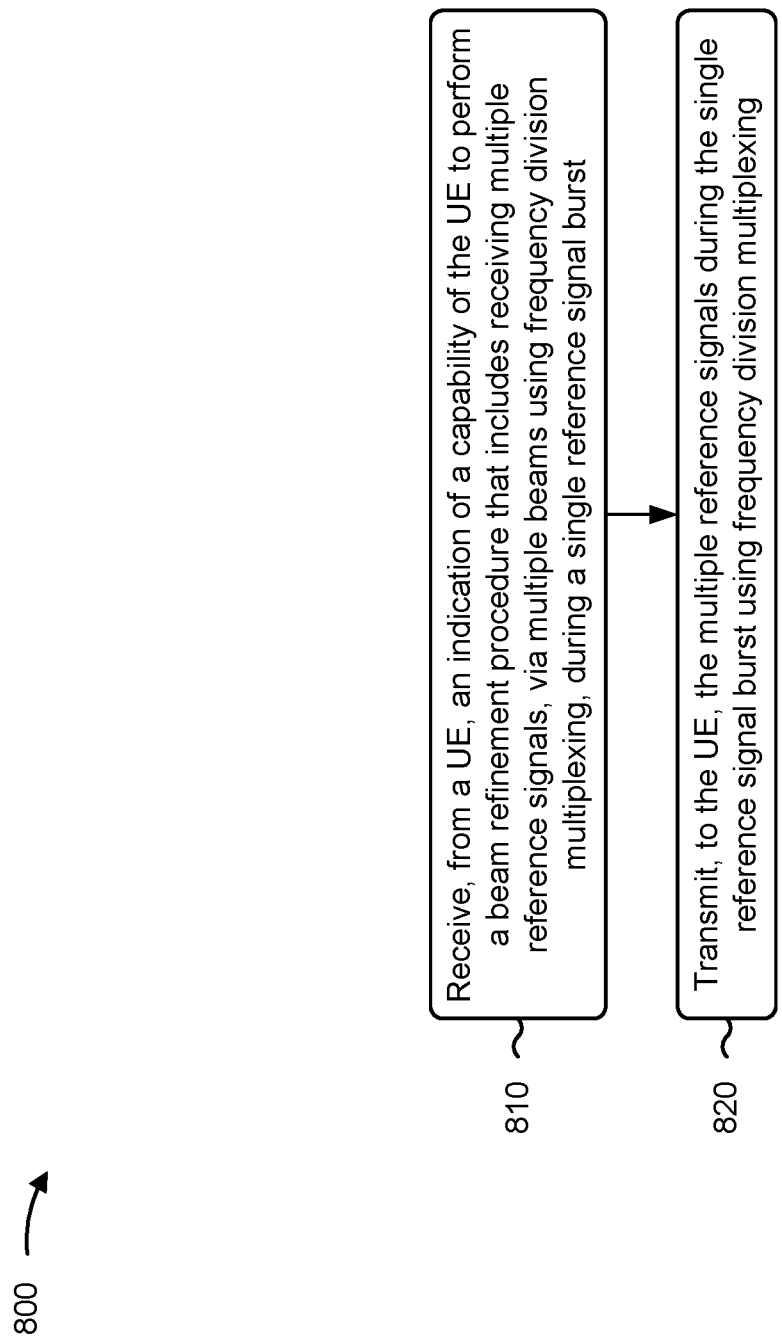

FIG. 8 is a diagram illustrating an example process 800 performed, for example, by a base station, in accordance with the present disclosure. Example process 800 is an example where the base station (e.g., base station 110) performs operations associated with beam refinement procedure.

As shown in FIG. 8, in some aspects, process 800 may include receiving, from a UE, an indication of a capability of the UE to perform a beam refinement procedure that includes receiving multiple reference signals, via multiple beams using frequency division multiplexing, during a single reference signal burst (block 810). For example, the base station (e.g., using reception component 1002, depicted in FIG. 10) may receive, from a UE, an indication of a capability of the UE to perform a beam refinement procedure that includes receiving multiple reference signals, via multiple beams using frequency division multiplexing, during a single reference signal burst, as described above.

As further shown in FIG. 8, in some aspects, process 800 may include transmitting, to the UE, the multiple reference signals during the single reference signal burst using frequency division multiplexing (block 820). For example, the base station (e.g., using transmission component 104, depicted in FIG. 10) may transmit, to the UE, the multiple reference signals during the single reference signal burst using frequency division multiplexing, as described above.

Process 800 may include additional aspects, such as any single aspect or any combination of aspects described below and/or in connection with one or more other processes described elsewhere herein.

In a first aspect, the beam refinement procedure is associated with a previously performed base station beam selection procedure.

In a second aspect, alone or in combination with the first aspect, the base station beam selection procedure includes selection of a wide beam for an initial connection between the base station and the UE, and wherein the beam refinement procedure includes selection of a narrow beam, associated with the wide beam, for communications between the base station and the UE.

In a third aspect, alone or in combination with one or more of the first and second aspects, process 800 includes receiving a report of measurements of the multiple reference signals.

In a fourth aspect, alone or in combination with one or more of the first through third aspects, process 800 includes transmitting an indication of resource locations associated with the multiple reference signals.

In a fifth aspect, alone or in combination with one or more of the first through fourth aspects, transmitting the indication of the resource locations associated with the multiple reference signals includes one or more of transmitting RRC signaling that includes the indication of the resource locations associated with the multiple reference signals, transmitting a CSI-RS reference resource that includes the indication of the resource locations associated with the multiple reference signals, or transmitting configuration information that associates the resource locations with reference signal identifications of the multiple reference signals.

In a sixth aspect, alone or in combination with one or more of the first through fifth aspects, the multiple reference signals include multiple CSI-RSs.

In a seventh aspect, alone or in combination with one or more of the first through sixth aspects, each reference signal of the multiple reference signals is located at different frequencies.

In an eighth aspect, alone or in combination with one or more of the first through seventh aspects, the single reference signal burst includes a burst received over a single symbol.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
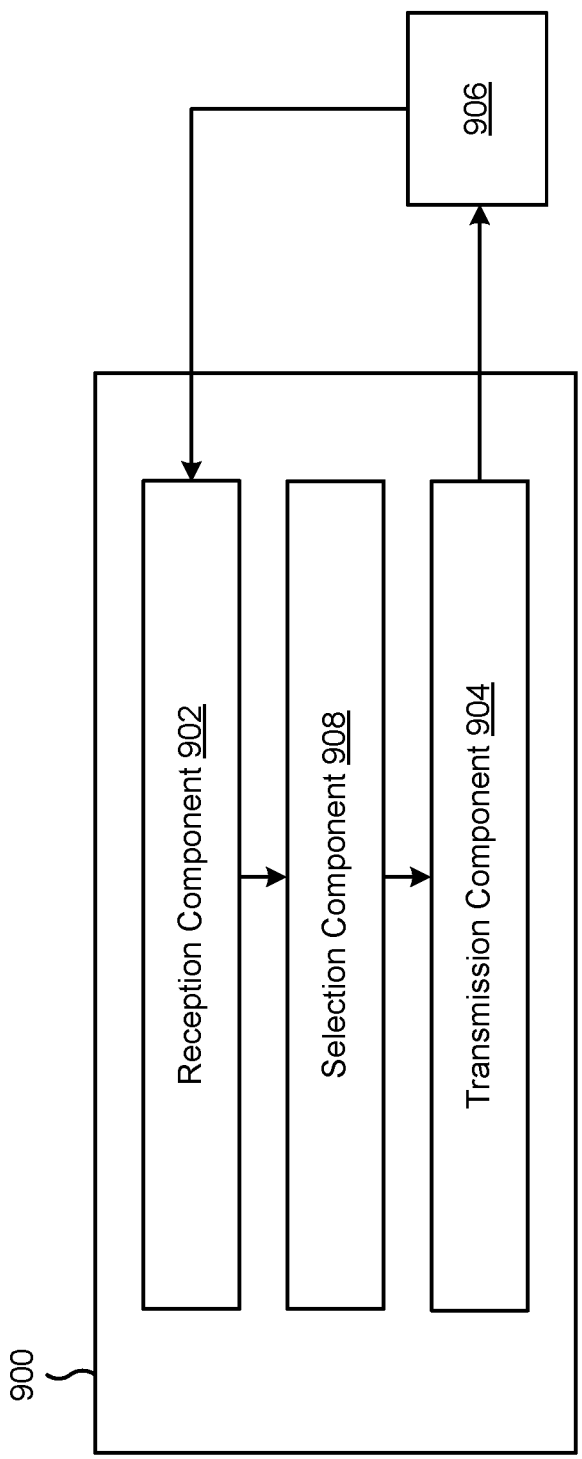
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a selection component 908.

In some aspects, the apparatus 900 may be configured to perform one or more operations described herein in connection with FIG. 5 or 6. Additionally, or alternatively, the apparatus 900 may be configured to perform one or more processes described herein, such as process 700 of FIG. 7.

In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The transmission component 904 may transmit an indication of a capability to perform a beam refinement procedure that includes receiving multiple reference signals, via multiple beams using frequency division multiplexing, during a single reference signal burst. The reception component 902 may receive the multiple reference signals during the single reference signal burst using frequency division multiplexing.

The reception component 902 may measure the multiple reference signals.

The transmission component 904 may transmit a report of measurements of the multiple reference signals.

The reception component 902 may measure the multiple reference signals using multiple UE beams.

The selection component 908 may select one or more beam pairs that each include a base station beam, associated with a reference signal of the multiple reference signals, and a UE beam, of the multiple UE beams. In some aspects, the selection component 908 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 904 may transmit, to a base station, an indication of the base station beam of each of the one or more beam pairs.

The reception component 902 may receive an indication of resource locations associated with the multiple reference signals.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
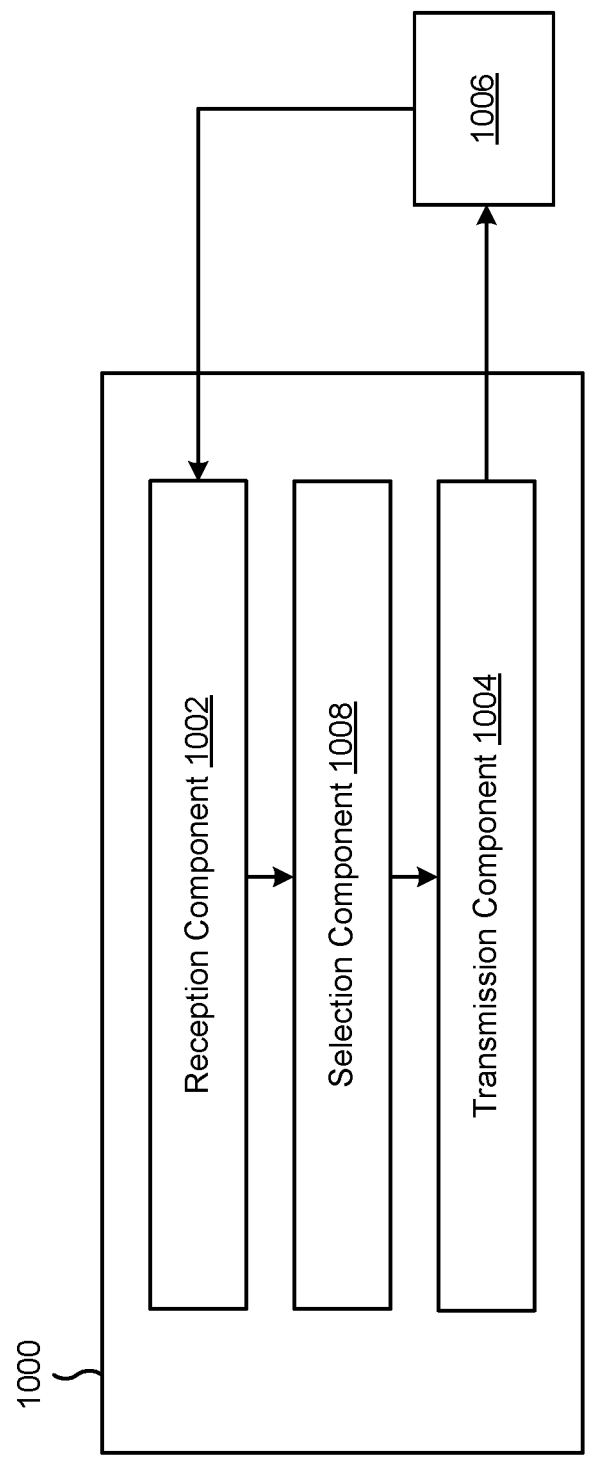

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a selection component 1008.

In some aspects, the apparatus 1000 may be configured to perform one or more operations described herein in connection with FIG. 5 or 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be collocated with the reception component 1002 in a transceiver.

The reception component 1002 may receive, from a UE, an indication of a capability of the UE to perform a beam refinement procedure that includes receiving multiple reference signals, via multiple beams using frequency division multiplexing, during a single reference signal burst. The transmission component 1004 may transmit, to the UE, the multiple reference signals during the single reference signal burst using frequency division multiplexing.

The reception component 1002 may receive a report of measurements of the multiple reference signals.

The transmission component 1004 may transmit an indication of resource locations associated with the multiple reference signals.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting an indication of a capability to perform a beam refinement procedure that includes receiving multiple reference signals, via multiple beams using frequency division multiplexing, during a single reference signal burst; and receiving the multiple reference signals during the single reference signal burst using frequency division multiplexing.

Aspect 2: The method of Aspect 1, wherein the beam refinement procedure is associated with a previously performed base station beam selection procedure.

Aspect 3: The method of Aspect 2, wherein the base station beam selection procedure comprises selection of a wide beam for an initial connection between a base station and the UE, and wherein the beam refinement procedure comprises selection of a narrow beam, associated with the wide beam, for communications between the base station and the UE.

Aspect 4: The method of any of Aspects 1-3, further comprising: measuring the multiple reference signals; and transmitting a report of measurements of the multiple reference signals.

Aspect 5: The method of any of Aspects 1-4, further comprising: measuring the multiple reference signals using multiple UE beams; and selecting one or more beam pairs that each include a base station beam, associated with a reference signal of the multiple reference signals, and a UE beam, of the multiple UE beams.

Aspect 6: The method of Aspect 5, further comprising: transmitting, to a base station, an indication of the base station beam of each of the one or more beam pairs.

Aspect 7: The method of any of Aspects 1-6, further comprising: receiving an indication of resource locations associated with the multiple reference signals.

Aspect 8: The method of Aspect 7, wherein receiving the indication of the resource locations associated with the multiple reference signals comprises one or more of: receiving radio resource control signaling that includes the indication of the resource locations associated with the multiple reference signals; receiving a channel state information reference signal reference resource that includes the indication of the resource locations associated with the multiple reference signals; or receiving configuration information that associates the resource locations with reference signal identifications of the multiple reference signals.

Aspect 9: The method of any of Aspects 1-8, wherein the multiple reference signals comprise multiple channel state information reference signals.

Aspect 10: The method of any of Aspects 1-9, wherein each reference signal of the multiple reference signals is located at different frequencies.

Aspect 11: The method of any of Aspects 1-10, wherein the single reference signal burst comprises a burst received over a single symbol.

Aspect 12: A method of wireless communication performed by a base station, comprising: receiving, from a user equipment (UE), an indication of a capability of the UE to perform a beam refinement procedure that includes receiving multiple reference signals, via multiple beams using frequency division multiplexing, during a single reference signal burst; and transmitting, to the UE, the multiple reference signals during the single reference signal burst using frequency division multiplexing.

Aspect 13: The method of Aspect 12, wherein the beam refinement procedure is associated with a previously performed base station beam selection procedure.

Aspect 14: The method of Aspect 13, wherein the base station beam selection procedure comprises selection of a wide beam for an initial connection between the base station and the UE, and wherein the beam refinement procedure comprises selection of a narrow beam, associated with the wide beam, for communications between the base station and the UE.

Aspect 15: The method of any of Aspects 12-14, further comprising: receiving a report of measurements of the multiple reference signals.

Aspect 16: The method of any of Aspects 12-15, further comprising: transmitting an indication of resource locations associated with the multiple reference signals.

Aspect 17: The method of Aspect 16, wherein transmitting the indication of the resource locations associated with the multiple reference signals comprises one or more of: transmitting radio resource control signaling that includes the indication of the resource locations associated with the multiple reference signals; transmitting a channel state information reference signal reference resource that includes the indication of the resource locations associated with the multiple reference signals; or transmitting configuration information that associates the resource locations with reference signal identifications of the multiple reference signals.

Aspect 18: The method of any of Aspects 12-17, wherein the multiple reference signals comprise multiple channel state information reference signals.

Aspect 19: The method of any of Aspects 12-18, wherein each reference signal of the multiple reference signals is located at different frequencies.

Aspect 20: The method of any of Aspects 12-19, wherein the single reference signal burst comprises a burst received over a single symbol.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network entity for wireless communication, comprising:
one or more memories; and
one or more processors, coupled to the one or more memories, configured to:
transmit, to a user equipment (UE), configuration information indicating the UE is to transmit an indication of a capability to perform a beam refinement procedure that includes receiving multiple reference signals, via multiple beams, during a single reference signal burst;
receive, from the UE, the indication of the capability to perform the beam refinement procedure;
receive, from the UE, and subsequent to receiving the indication of the capability, a request to receive the multiple reference signals via multiple beams using frequency division multiplexing; and transmit, to the UE, the multiple reference signals during the single reference signal burst using the frequency division multiplexing.

2. The network entity of claim 1, wherein the beam refinement procedure is associated with a previously performed beam management procedure.

3. The network entity of claim 2, wherein the previously performed beam management procedure comprises selection of a wide beam for an initial connection between the network entity and the UE, and
wherein the beam refinement procedure comprises selection of a narrow beam, associated with the wide beam, for communications between the network entity and the UE.

4. The network entity of claim 1, wherein the one or more processors are further configured to:
receive a report of measurements of the multiple reference signals.

5. The network entity of claim 1, wherein the one or more processors are further configured to:
transmit an indication of resource locations associated with the multiple reference signals.

6. The network entity of claim 5, wherein the one or more processors, to transmit the indication of the resource locations associated with the multiple reference signals, are configured to one or more of:
transmit radio resource control signaling that includes the indication of the resource locations associated with the multiple reference signals;
transmit a channel state information reference signal reference resource that includes the indication of the resource locations associated with the multiple reference signals; or
transmit information that associates the resource locations with reference signal identifications of the multiple reference signals.

7. The network entity of claim 1, wherein the multiple reference signals comprise multiple channel state information reference signals.

8. The network entity of claim 1, wherein each reference signal of the multiple reference signals is located at different frequencies.

9. The network entity of claim 1, wherein the single reference signal burst comprises a burst received over a single symbol.

10. A method of wireless communication performed by a network entity, comprising:
transmitting to a user equipment (UE), configuration information indicating the UE is to transmit an indication of a capability to perform a beam refinement procedure that includes receiving multiple reference signals, via multiple beams, during a single reference signal burst;
receiving, from the UE, the indication of the capability to perform the beam refinement procedure;
receiving, from the UE, and subsequent to receiving the indication of the capability, a request to receive the multiple reference signals via multiple beams using frequency division multiplexing; and
transmitting, to the UE, the multiple reference signals during the single reference signal burst using the frequency division multiplexing.

11. The method of claim 10, wherein the beam refinement procedure is associated with a previously performed beam management procedure.

12. The method of claim 11, wherein the previously performed beam management procedure comprises selection of a wide beam for an initial connection between the network entity and the UE, and
wherein the beam refinement procedure comprises selection of a narrow beam, associated with the wide beam, for communications between the network entity and the UE.

13. The method of claim 10, further comprising:
receiving a report of measurements of the multiple reference signals.

14. The method of claim 10, further comprising:
transmitting an indication of resource locations associated with the multiple reference signals.

15. An apparatus for wireless communication, comprising:
means for transmitting configuration information indicating a user equipment (UE) is to transmit an indication of a capability to perform a beam refinement procedure that includes receiving multiple reference signals, via multiple beams, during a single reference signal burst;
means for receiving, from the UE, the indication of the capability to perform the beam refinement procedure;
means for receiving, from the UE, and subsequent to receiving the indication of the capability, a request to receive the multiple reference signals via multiple beams using frequency division multiplexing; and
means for transmitting the multiple reference signals during the single reference signal burst using the frequency division multiplexing.

16. The apparatus of claim 15, further comprising:
means for receiving a report of measurements of the multiple reference signals.

17. The apparatus of claim 15, wherein the configuration information indicates that the apparatus is to provide the UE with an indication corresponding to whether performance of the beam refinement procedure is enabled.

18. The apparatus of claim 15, wherein the single reference signal burst comprises a burst received over a single symbol.

19. The apparatus of claim 15, wherein the multiple reference signals comprise multiple channel state information reference signals.

20. The apparatus of claim 15, wherein each reference signal of the multiple reference signals is located at different frequencies.

* * * * *